United States Patent
Singer

(10) Patent No.: US 6,724,894 B1
(45) Date of Patent: Apr. 20, 2004

(54) CRYPTOGRAPHIC DEVICE HAVING REDUCED VULNERABILITY TO SIDE-CHANNEL ATTACK AND METHOD OF OPERATING SAME

(75) Inventor: Ari P. Singer, Hamden, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/434,454

(22) Filed: Nov. 5, 1999

(51) Int. Cl.$^7$ .............. H04K 1/00; H04L 9/28
(52) U.S. Cl. .............. 380/28; 380/42; 380/45; 380/277; 705/60
(58) Field of Search .............. 380/28, 277, 42, 380/45; 705/60

(56) References Cited

U.S. PATENT DOCUMENTS

| | | | | |
|---|---|---|---|---|
| 4,527,798 A | * | 7/1985 | Siekierski et al. | 463/17 |
| 4,641,346 A | | 2/1987 | Clark et al. | 380/3 |
| 4,641,347 A | | 2/1987 | Clark et al. | 380/3 |
| 4,725,718 A | | 2/1988 | Sansone et al. | 235/495 |
| 4,775,246 A | | 10/1988 | Edelman et al. | 380/23 |
| 4,802,218 A | | 1/1989 | Wright et al. | 380/23 |
| 4,831,555 A | | 5/1989 | Sansone et al. | 364/519 |
| 4,853,961 A | | 8/1989 | Pastor | 380/21 |
| 5,812,666 A | * | 9/1998 | Baker et al. | 380/277 |
| 6,002,769 A | * | 12/1999 | McGough | 380/28 |

FOREIGN PATENT DOCUMENTS

| | | |
|---|---|---|
| FR | 2776445 | 3/1998 |
| WO | WO93/20538 | 10/1993 |
| WO | WO98/52319 | 11/1998 |
| WO | WO99/35782 | 7/1999 |

OTHER PUBLICATIONS

"Timing Attacks on Implementations of Diffie–Hellman, RSA, DSS, and Other Systems," Paul C. Kocher, Cryptography Consultant, PO Box 8243, Stanford, CA 94309 USA; Publication Date Aug. 8, 18, 1996.

* cited by examiner

Primary Examiner—Gilberto Barrón
Assistant Examiner—Benjamin E. Lanier
(74) Attorney, Agent, or Firm—Brian A. Lemm; Angelo N. Chaclas; Charles R. Malandra, Jr.

(57) ABSTRACT

A cryptographic device and method of operation for encrypting messages. The device can be incorporated into a postage metering system to provide cryptographically secured postal indicia. The device and method provide increased security against side-channel attacks such as differential power analysis (DPA). An encryption key is transformed with a first function to generate temporary key as a function of a random number. A message is encrypted with the temporary key to generate a modified message. The modified message is transformed with a second function to generate an encryption. The encryption generated is identical to a direct encryption of the message with the untransformed key. The temporary key is changed frequently to protect against side-channel attacks.

14 Claims, 3 Drawing Sheets

CRYPTOGRAPHIC DEVICE HAVING REDUCED VULNERABILITY TO SIDE-CHANNEL ATTACK AND METHOD OF OPERATING SAME

RELATED APPLICATIONS

The present application shares common elements of disclosure with commonly assigned, U.S. application Ser. No. 09/217,977; titled: SYSTEM AND METHOD FOR SUPPRESSING CONDUCTED EMISSIONS BY A CRYPTOGRAPHIC DEVICE, now U.S. Pat. No. 6,594,760.

BACKGROUND OF THE INVENTION

The present invention relates generally to cryptographic devices and, more particularly, to cryptographic devices having reduced vulnerability to side-channel attack and methods for operating such devices to reduce such vulnerability. Still more particularly it relates to such devices and methods incorporated into postage metering systems employing cryptographic processes for evidencing postage payment.

Side channel attacks pose a significant threat to cryptographic systems. Such attacks involve analysis of related signals produced when an encrypted message is produced to obtain information which simplifies analysis of the cryptographic system under attack. One recently published technique of side channel attack is differential power analysis (DPA). This technique involves observation and analysis of fluctuations on the power line of a cryptographic device to determine the cryptographic secrets, i.e., the crypto keys, used by the device.

DPA attacks allow an attacker to extract secret protected information from a supposedly secure cryptographic device by measuring variations in power consumption over time, and then applying sophisticated analysis to this information. Any type of secure cryptographic device where such power variations are accessible is potentially susceptible to the attack. Such devices include smart cards, PC (PCMCIA) cards and printed circuit boards, including devices that are housed within a protected enclosure.

The attack is based on the principle that as the cryptographic processor performs its cryptographic functions, such as encryption or signing; transistors comprising the processor switch on and off, which changes the amount of current drawn from the source supplying power to the processor. The attacker can correlate the current changes with data being processed and the crypto keys ( hereinafter sometimes "keys") being used. The significance of the attack is as follows.

Secure information systems are based on an assumption that the secret information, i.e., the crypto keys, stored within a secure cryptographic device are protected against disclosure to any attacker. It is well known to use physical tamper-resistant or tamper-proof physical security to prevent such disclosure. With such physical security in effect, it has been assumed that an attacker without "cribs", i.e. information of some sort to simplify the analysis, could only obtain crypto keys either by trying all the possible crypto keys associated with the algorithm being used (symmetric algorithms) or by carrying out a complex mathematical search (asymmetric algorithms). For accepted cryptographic algorithms, this search is prohibitive, e.g. obtaining a 1024 bit RSA key requires 230 years of 300 Mhz PC computing. However, the DPA attack makes this assumption false. If the cryptographic device is subject to DPA attack, then the crypto key can be obtained in a matter of days or weeks using DPA. Thus it is imperative that the security community at large find means either to defeat this attack or to at least greatly lengthen the time and expertise needed to successfully carry it out.

Many of the proposed countermeasures to the DPA attack involve the introduction of signal noise or filters on the power line, random timing and delays during cryptographic processing, and the introduction of extraneous operations. These countermeasures make the attack much more difficult by decreasing the amount of information obtained from each sampling of the power line signal. However, an attacker can overcome them by obtaining more samples of power line fluctuations and applying more sophisticated analytical techniques. Thus if a key is used sufficiently often it can be compromised by such attacks. Thus it would be advantageous to limit the amount of use of each particular key and ideally to use a different key for each message encrypted. However, this approach of substantially reducing usage creates great difficulty in the management of key distribution and is generally not useful outside of military or similar applications where the number of parties using a key is small.

One application of cryptographic processes where it is anticipated that protection against side channel attacks will be important is in postage metering systems. The vast majority of the Posts around the world require prepayment for postal services provided by the Posts. This allows the Posts to avoid the substantial time and cost associated with a post-payment system that requires processing billing data and collecting and processing remittance. Prepayment, however, necessitates that individual mailpieces carry verifiable evidence of paid postage. The traditional postage stamp is a prime example of such evidence. Postage meters which securely couple mechanical printing of postal indicia and accounting functions to assure that unpaid indicia are not printed are another well known means for evidencing postage payment. Postal revenue security in the such postage meters depends on two features: 1) physical security of the printing process, i.e., printing of postage evidence can not occur without appropriate accounting, and 2) forensic delectability, i.e., fraudulent postal indicia can be distinguished from legitimate indicia.

Coupling the printing and accounting mechanism within a secure tamper-evident enclosure provides physical security of printing. Inspection of the device normally reveals tampering. Effective forensic delectability of fraudulent postal indicia depends on non-availability of alternative mechanisms suitable for forging indicia. Before the proliferation of inexpensive, high print quality computer printers, serious attempts to generate fraudulent indicia using an alternate printing mechanism were detectable.

Today, the availability of inexpensive computer-driven printers provides opportunities for customer convenience and cost advantages for printing postage evidence. However, the use of such printers requires a new way of securing postage which was first suggested in U.S. Pat. Nos. 4,641,347, 4,641,346, 4,757,537, and 4,775,246. At that time, it was realized that the security of postage evidencing depends on the security of the information printed in the indicium, including message authentication and integrity.

U.S. Pat. Nos. 4,831,555 and 4,725,718 extended this idea to unsecured printing of postage; disclosing the necessity that at least some of the information in the indicium must appear random to a party not in possession of some secret. Such random looking information is commonly referred to as a digital token.

The basis of postal revenue security in the digital world is two new requirements: 1) security of the digital token generating process, i.e., digital tokens can not be generated without appropriate accounting, and 2) automatic delectability, i.e., fraudulent digital tokens can be detected by automatic means.

A encryption of selected data on the mailpiece with a secret key is one method for producing a digital token. The data may include postage value, date, postal code of the geographical deposit area, recipient address information, meter data, and piece count. Such data is commonly referred to as postal data. The secret key used to generate the digital token is generally held within the accounting device. A verifier, with access to a verifying key corresponding to the accounting device key, validates the digital token. Several cryptographic algorithms and protocols have been considered for this purpose. U.S. Pat. No. 4,853,961 describes critical aspects of public-key cryptography for mailing applications. See: José Pastor, CRYPTOPOST "A Universal Information-Based Franking System for Automated Mail Processing, Proceedings of the Four the Advanced Technology Conference of the U.S. Postal Service, Vol. I, pp. 429–442, Nov. 1990. See also José Pastor, CRYPTOPOST "A Cryptographic Application to Mail Processing, Journal of Cryptology, 3 (2), pp. 137–146, Nov. 1990.

Two methods of presenting a postal verifier with fraudulent evidence of payment are a counterfeited indicium and a copied indicium. The former is an illegitimately generated indicium that appears legitimate. The latter is a copy of a legitimate paid indicium. The subject invention addresses the prevention of counterfeit indicia by illegitimately obtaining a secret key and is not related to detection of copied indicia; which relies upon techniques such as detection of duplicate indicia.

A counterfeit indicium can be detected by verifying the digital token. Verification proves that the digital token was generated by a cryptographic algorithm with access to the secret meter key. The information printed in the indicium and access to a verifying key are sufficient for the detection of counterfeited indicia as long as the secret meter key is confidential. In a public-key system, a digital signature provides the data authentication and integrity check. In a symmetric-key system a message authentication code (MAC) provides a similar check.

Detection of counterfeiting is an integrity check. Assuming integrity of the verification software and hardware, only a compromised meter secret-key can reliably produce counterfeit indicia that passes an integrity check. This compromise could happen by violating the physical protection of the key by tampering, or by deriving the key from indicia data by cryptanalysis. Generally, tampering is detectable if the physical protection of the secure component of the postage metering system is adequate, for example following FIPS 140-1, Security Requirements for Cryptographic Modules, National Institute for Standards and Technology, Jan. 1994. Robustness against cryptanalysis depends on the difficulty of solving certain mathematical problems, for example, discrete logarithm problems or factoring a large composite number. As part of its proposed Information-Based Indicia Program (IBIP), the USPS has proposed 1024 bit RSA or 1024 bit DSS as a measure of robustness.

The IBIP is a distributed trusted system that is expected to support new methods of applying postage in addition to, and eventually in lieu of, the current approach, which typically relies on a postage meter to mechanically print indicia on mailpieces. The IBIP requires printing large, high density, two dimensional (2-D) bar codes on mailpieces. The Postal Service expects the IBIP to provide cost-effective assurance of postage payment for each mailpiece processed. The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

There are three information security objectives critical for postage evidencing: authentication, wherein a Post can read a payment message printed on a mailpiece and identify the postage accounting device responsible for the message; data Integrity, wherein the Post can detect any alteration of the payment message; and evidence of fraud, wherein the Post can detect evidence of fraud, such as a mailpiece with a counterfeited indicium or mailpieces with identical indicia.

In order to achieve authentication, the payment message must include an unique postage accounting device identification number and a message identification number, for example, a serial piece count or ascending register. The integrity of the payment itself requires inclusion of the postage amount. These elements, collectively referred to as postal or security data, represent a minimal set. Depending on the verification strategy additional elements, including delivery address information, may be included. An indicium should, at a minimum, contain: 1) the security data, and 2) the digital token produced by a encryption of the security data. Cryptographic authentication proves integrity of these elements.

Presently, there are two postage metering types: closed systems and open systems. In a closed system, the system functionality is solely dedicated to metering activity. Examples of closed system metering devices include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. That is an indicium printed without accounting for postage will be detected. See, for example, U.S. Pat. No. 4,802,218, issued to Christopher B. Wright et al and now assigned to the assignee of the present invention. An example of a digital printing postage meter with secure printhead communication is the Personal Post Office" manufactured by Pitney Bowes Inc. of Stamford, Connecticut. An example of a digital printing postage meter in a secure housing is the PostPerfect" also manufactured by Pitney Bowes Inc.

It will be apparent from the above discussion that protection of secret meter keys is critical to the success of new meter technologies such as the IBIP. Compromise of a meter secret key can allow the generation of counterfeit indicia which cannot be detected by cryptographic verification, while the reduced need for physical inspection of the meters may increase opportunities for side-channel attacks such as DPA.

Thus it is an object of the subject invention to provide cryptographic devices and methods for operation of such devices which reduce the vulnerability to side-channel attacks, particularly DPA.

BRIEF SUMMARY OF THE INVENTION

The above object is achieved and the disadvantages of the prior art are overcome in accordance with the subject invention by means of a cryptographic device and a method for operating such a device which include:

a) storing a key e and an encryption function $E(x,y)$, where $E(x,y)$ is an encryption of an arbitrary message x with an arbitrary key y in the device;

b) storing a first, resistant function $F_1(y,t)$ and a second function $F_2(x,t)$, where t is an arbitrary integer and $F_2(E(x, F_1(y,t)), t)=E(x,y)$ in the device; and then controlling the device to c) input a message m for encryption;

d) select a random number r;

e) generate a temporary key $F_1(e,r)$;

f) generate $E(m, F_1(e,r))$;

g) generate $F_2(E(m, F_1(e,r)), r)=E(m,e)$ as an encryption c of the message m with the key e; and h) output the encryption c.

Thus signals generated by said device which are susceptible to side-channel attack will vary with the random number r thus reducing the vulnerability of the key e to side channel analysis.

In accordance with one aspect of the subject invention, where n is a secret number equal to p times q, where p and q are secret prime numbers, and where $\phi(n)$ is the number of positive integers less than or equal to n that are relatively prime to n:

a) the encryption function $E(x,y)$ equals $x^y \bmod(n)$;

b) the first function $F_1(y,t)$ equals $(y)(1/t \bmod(\phi(n)))$; and c) the second function $F_2(x,t)$ equals $x^t \bmod(n)$; with the result that d) $F_2(E(m, F_1(e,r)), r)=(m^{e/r} \bmod(n))^r \bmod(n)$, where the exponent e/r is taken to be $(e)(1/r \bmod(\phi(n)))$, equals $m^e \bmod(n)$, as the encryption c of the message m; whereby a recipient of the encryption c can recover the message m as $c^d \bmod(n)$, where $(e)(d)=1 \bmod(\phi(n))$.

In accordance with another aspect of the subject invention the message m includes postal data and the encryption c is incorporated into a postal indicium.

In accordance with another aspect of the subject invention values for r are generated by a random number generator.

In accordance with another aspect of the subject invention values for r and $(1/r \bmod(\phi(n)))$ are selected from a table of predetermined values.

In accordance with still another aspect of the subject invention, where the computational burden is distributed between the message originator and message recipient, the device is operated to:

a) store a key e and an encryption function $E(x,y)$, where $E(x,y)$ is an encryption of an arbitrary message x with an arbitrary key y in the device;

b) store a first, resistant function $F_1(y,t)$ and a second function $F_2(x,t)$, where t is an arbitrary integer and $F_2(E(x, F_1(y,t)), t)=E(x,y)$ in the device; and then to c) input a message m for encryption;

d) select a random number r;

e) generate a temporary key $F_1(e,r)$;

f) generate $E(m, F_1(e,r))$; and the to g) output $E(m, F_1(e,r))$, the message recipient being provided with the random number r. The message recipient can generate $F_2(E(m, F_1(e,r)), r)=E(m,e)$ as an encryption c of said message m with said key e, and then decrypt said encryption c.

Other objects and advantages of the subject invention will be apparent to those skilled in the art from consideration of the attached drawings and the detailed description set forth below.

BRIEF DESCRIPTION OF THE DRAWINGS

In which like reference characters refer to like parts or steps throughout.

DETAILED DESCRIPTION OF PREFERRED EMBODIMENTS OF THE SUBJECT INVENTION

Figure 1:
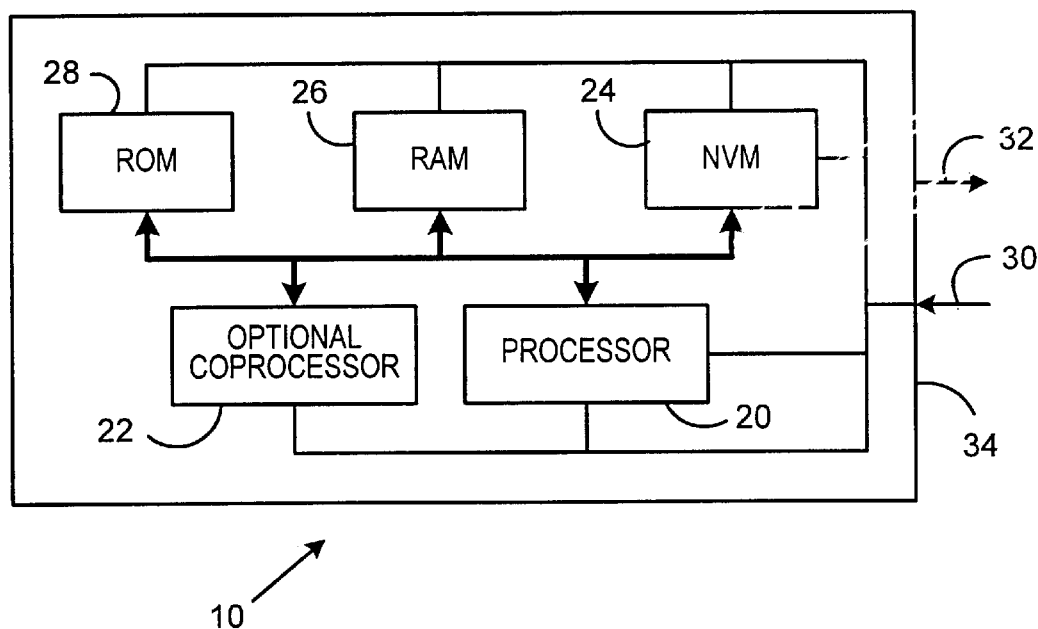
FIG. 1 shows a cryptographic device used in a postage metering system for the generation of cryptographically secured postal indicia.

Referring now to FIG. 1, a block diagram of a cryptographic device, generally designated 10, is shown. Cryptographic device 10 includes a conventional processor 20, coupled to an optional coprocessor 22, non-volatile memory 24, random access memory 26 and read-only memory 28. Cryptographic device 10 is enclosed within a secure housing 34. The secure housing 34 may be any conventional means for preventing access to cryptographic device 10. For example, secure housing 34 may be a integrated circuit chip encased in an epoxy that prevents access to the integrated circuit without destruction of the integrated circuit. Power to cryptographic device 10 is input at power line 30. Input/output communications occur at I/O line 32. It will be understood that cryptographic device 10 may be implemented as any number of discrete components or as a single integrated circuit, such as a smart card.

In a preferred embodiment of the subject invention read-only memory 28 stores program code to control device 10 to function in a postage metering system to generate secure postal indicia and account for postage expenditure as described above. Postal data is input through I/O line 32 and processor 20 operates in accordance with the program code to generate a corresponding postal indicium, account for postage expended in account registers in non-volatile memory 24, and control a printer (not shown) to print the indicium. Read-only memory 28 stores initial information, such as a meter identification number and an encryption key, used to generate the indicium.

The general operation of such metering systems is known and is described, for example in the above mentioned U.S. Pat. Nos.: 4,831,555 and 4,725,718 and IBIP specifications. Except as set forth below, a more detailed discussion of the operation of postage metering systems is not believed necessary for an understanding of the subject invention.

Figure 2:
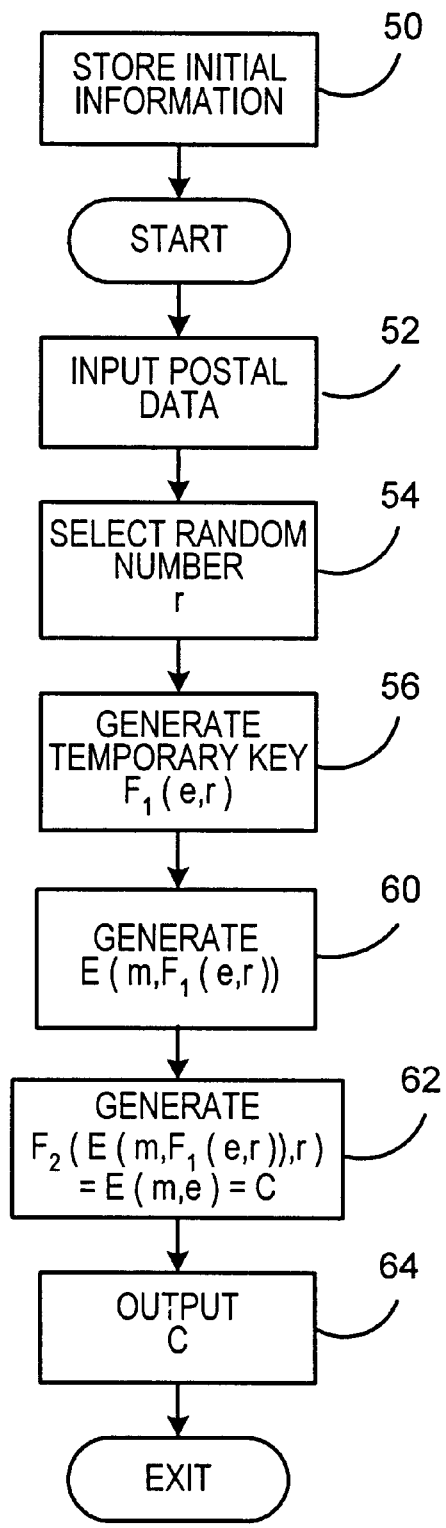
FIG. 2 shows a flow diagram of the operation of the device of FIG. 1 in accordance with one embodiment of the subject invention.

FIG. 2 shows a flow diagram of the operation of device 10 to encrypt postal data for incorporation into indicia to provide security. In other embodiments of the subject invention other types of messages can be encrypted in a substantially identical manner.

Preferably the encryption operations described below are carried out by optional coprocessor 22 but, in embodiments where coprocessor 22 is omitted they can be carried out by processor 20, albeit more slowly.

At 50 device 10 is initialized by storing at least an encryption key e and, preferably initial information used to identify the postage metering system incorporating device 10.

Preferably, this initial information is incorporated into the postal data by processor 20 or coprocessor 22 in the input process to form a message m for encryption.

(Those skilled in the art will recognize that in a postage metering system device 10 carries out a signing operation; that is a message, or more typically a selected portion of a message generated by applying a "hashing" function to the message, is encrypted for the purpose of verifying the source and/or authorization of the message rather for the purpose of concealing the message contents.)

Thereafter, when processing of an indicium begins, at 52 device 10 selects a random number r in any convenient manner which can include provision of a conventional random number generator to generate a number for each indicium, or selection of random number r from a predetermined table of random numbers. As used herein random number r can also be a product of particular random numbers $r_i$ of the general form: $(r_1^A)(r_2^B) \ldots (r_m^M)$.

(It should be noted that the term "random number" as used herein is not intended to imply that the sequence of numbers used in a series of encryption operations will satisfy mathematical tests of randomness, though this may be preferred as providing a higher degree of security. Rather since, as discussed below, knowledge of particular values of r will not help an attacker recover the key used herein, it is sufficient that the term "random number" as used herein means only that values of r are selected in any convenient manner, such as from pre-computed tables, which will assure that any particular value of r is not used so often, or so regularly, as to permit recovery of $F_1(e,r)$ through DPA; which includes, but is not limited to sequences of values of r which satisfy mathematical tests of randomness.)

Then, at 56, device 10 operates on encryption key e with a predetermined, resistant function $F_1(y,t)$, where t is an arbitrary integer, which function is preferably stored as an algorithm incorporated in the program code, to generate a temporary key $F_1(e,r)$.

It should be noted that the value of the key is exposed to DPA attack when a temporary key $F_1(e,r)$ is computed and that accordingly the term "resistant function", as used herein, means a function which is substantially more resistant to DPA attack than the encryption function. Proper selection of such a resistant function is described further below with respect to preferred RSA embodiments.

Then, at 60, device 10 encrypts message m with an encryption function $E(x,y)$, where $E(x,y)$ is an encryption of an arbitrary message x with an arbitrary key y using temporary key $F_1(e,r)$ to form $E(m, F_1(e,r))$.

Then, at 62, device 10 operates on $E(m, F_1(e,r))$ with a predetermined function $F_2(x,t)$, which is preferably stored as an algorithm incorporated in the program code, to generate $F_2(E(m, F_1(e,r)),r)$. In accordance with the subject invention the functions $F_1$ and $F_2$ are selected so that:

$F_2(E(x, F_1(y,t)), t) = E(x,y)$ and therefore:

$F_2(E(m, F_1(e,r)), r) = E(m,e)$, i.e. is an encryption c of said message m with said key e.

Then, at 64 device 10 outputs encryption c for incorporation in a postal indicium in accordance with conventional postal system operations or, in other embodiments, directly to a recipient, and then exits.

Those skilled in the art will recognize from the above discussion that the temporary key used in the encryption carried out at step can be changed as frequently as desired; as often as for each message. Thus it is believed that the temporary key can be made substantially immune to side-channel attacks, particularly DPA attacks, which generally require a relatively large number of samples of the power line signal to determine the key in use. And, without knowledge of the temporary key even an attacker with knowledge of r cannot determine key e. It should also be noted that encryption c is identically E(m,e) and that thus no other changes in normal postage metering system operation are needed; nor, in other embodiments, is any additional burden placed on message recipients.

Figure 3:
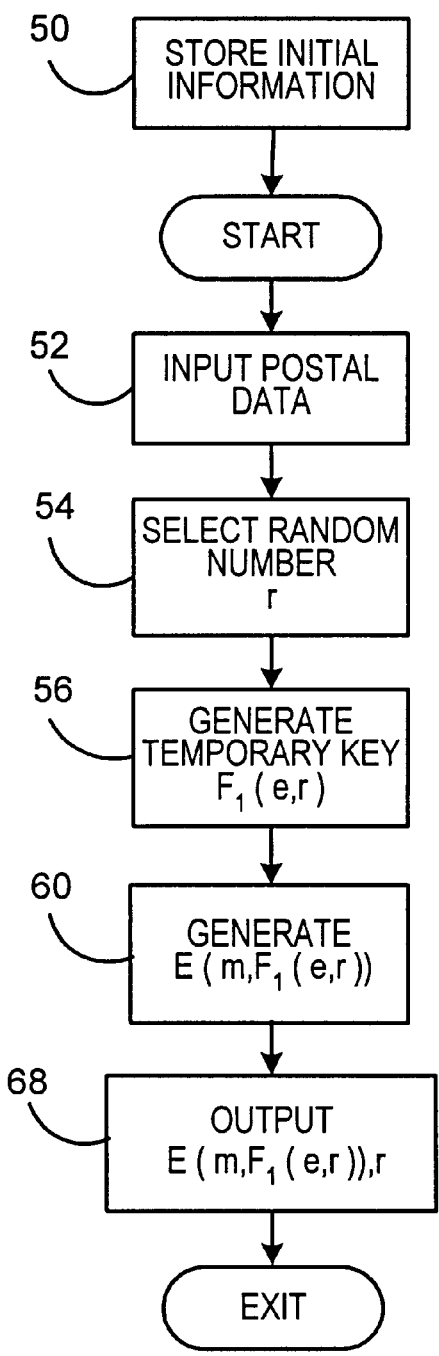
FIG. 3 shows a flow diagram of the operation of the device of FIG. 1 in accordance with another embodiment of the subject invention.

FIG. 3 shows a flow diagram of encryption in accordance with another embodiment of the subject invention where some of the computational burden is shifted to the message recipient. In FIG. 3 steps 50, 52, 54, 56, and 60 are carried out by device 10 in the manner described above to obtain $E(m, F_1(e,r))$. Then at 68 device 10 outputs a modified message $E(m, F_1(e,r))$, r, where r is appended in plain text. As discussed above even with knowledge of r an attacker will gain no advantage in determining either the temporary key $F_1(e,r)$ or key e. It should be noted that this embodiment will require some modifications to postage metering functions (which will be readily within the ability of those skilled in the art) to incorporate the modified message into postal indicia; and, as described further below, will require that message recipients know $F_2$.

Figure 4:
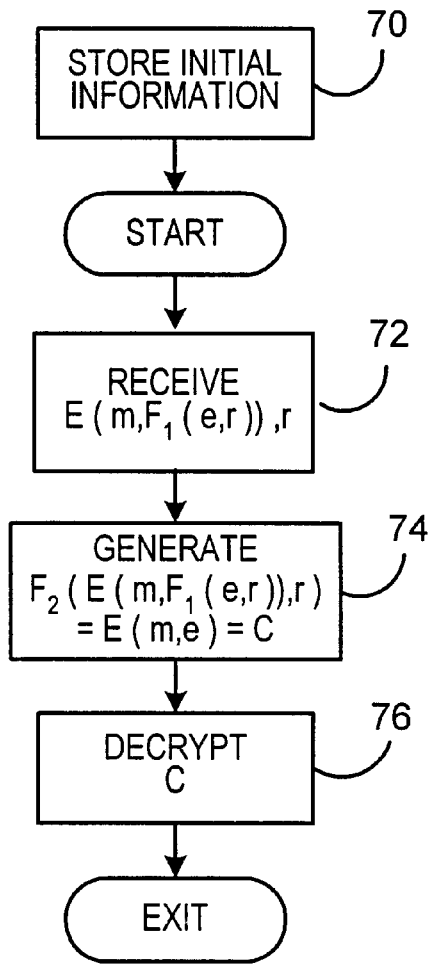
FIG. 4 shows a flow diagram of the decryption of a message generated in accordance with FIG. 3.

FIG. 4 shows the operation of a message recipient in recovering message m from a message transmitted in accordance with FIG. 3. At 70 the message recipient, which is preferably a programmable data processing system, is initialized with a decryption function D and a decryption key d corresponding to encryption function E, and key e.

In other embodiments of the subject invention r is not appended to the message but is provided to the recipient in any other convenient manner, such as by secure distribution of pre-computed tables.

Then at 72 the message recipient receives E(m, F$_1$(e,r)), r. In the preferred application where device 10 is incorporated into a postage metering system the modified message will be recovered from a postal indicium to validate the indicium.

Then, at 74, the message recipient generates F$_2$(E(m, F$_1$(e,r)), r)=E(m,e), encryption c of said message m with said key e; and at 76 uses Function D and key d to decrypt c in a normal manner, and exits. In another preferred embodiment messages are encrypted and decrypted with a public key system using exponentiation mod(n) such as the well known RSA system. In such systems n is a secret number equal to p times q, where p and q are secret prime numbers, and $\phi(n)$ is defined as the number of positive integers less than or equal to n that are relatively prime to n. In this embodiment:

encryption function E(x,y) equals $x^y$ mod(n);

first function F$_1$(y,t) equals (y)(1/t mod(($\phi(n)$))); and second function F$_2$(x,t) equals $x^t$ mod(n).

Under these conditions it can be proven that $\{m^{e/r}$ mod $(n)\}^r$ mod(n), where r is a random number as described above and the exponent e/r is taken to be (e)(1/r mod(($\phi(n)$))), equals $m^e$ mod(n), which is identically the encryption c of the message m with key e. A recipient of encryption c can recover message m in the normal manner as $c^d$=m mod(n), where e times d=1 mod($\phi(n)$).

In other embodiments of the subject invention where the computational burden is distributed, either r or 1/r can be chosen to be small to reduce the computational burden on either the message originator or the verifier as preferred for various applications. The random number r can be chosen to be small to decrease the time required to perform the exponentiation; note however that it is not feasible to chose both r and (1/r mod($\phi(n)$) to be small. Also, since (1/r mod($\phi(n)$))$^{-1}$=r mod ($\phi(n)$), r and $r^{-1}$ can be interchanged to decrease the required computation time of either the signer or the verifier.

It is believed that function F$_1$ satisfies the requirement discussed above and is more resistant than E since the computation of (y)(1/t mod(($\phi(n)$))) is very short compared to the computation time for $x^y$ mod(n) and uses the bits in a different way and is so easier to protect from DPA attacks.

(The term "congruent" and symbol "≈" are commonly used in mathematical treatments of modular arithmetic rather than the more familiar "equal" and "=". However those skilled in the art will readily understand the usage chosen in the present application for reasons of simplicity.)

It should also be noted that calculation of 1/r mod(($\phi(n)$)) may expose $\phi(n)$, and so e, to DPA attack so it is preferable that care be exercised in when and how values of 1/r are computed. For this reason the use of tables of pairs (r, 1/r), with off line pre-computation of 1/r, may be preferred. Consideration of the relations set forth above:

$m^e$=c mod(n); and $c^d$=m mod(n)

immediately shows the reversibility of such public key systems. That is, the encryption and decryption processes are computationally the same and differ only in the meanings given to message m and encryption c. The subject invention has been described above in terms of applications such as signing messages where the security of the encryption key e is critical to prevent counterfeiting of digital signatures but where the decryption key can be the public key in a public key system without loss of security. In other applications of public key systems, where security of the message content is critical the message can be encrypted with a known public key and it is the security of the decryption key which is critical. Since encryption and decryption are computationally the same the subject invention can be used to protect decryption keys in such applications in the manner described above and the term "encryption" as used herein should be understood to include decryption in such reversible applications. That is, as noted, in the postage metering embodiments discussed the encrypted message is a signature used to authenticate a postal indicium. In other applications of public key encryption, where messages are encrypted with a known public key to protect the message content, methods substantially as described with respect to FIGS. 2, and 3 and 4 can be used to protect the private key used to decrypt the message.

The embodiments described above and illustrated in the attached drawings have been given by way of example and illustration only, from the teaching of the present application those skilled in the art will readily recognize numerous other embodiments in accordance with the subject invention. In particular it will be recognized that the subject invention can be used to protect other uses of encryption keys, such as postage meter refills, where a meter is recharged with funds to allow continued printing of indicia. Accordingly, limitations on the subject invention are to be found only in the claims set forth below.

What is claimed is:

1. A method for operating a cryptographic device, said method comprising the steps of:

storing a key e and an encryption function E(x,y), where E(x,y) is an encryption of an arbitrary message x with an arbitrary key y and E(x,y) equals $x^y$ mod(n), where n is a secret number equal to p times q, where p and a are secret prime numbers;

storing a first, resistant function F$_1$(y,t) and a second function F$_2$(x,t), where t is an arbitrary integer, said first function F$_1$(y,t) equals (v)(1/t mod($\phi(n)$)), where $\phi(n)$ is the number of positive integers less than or equal to n that are relatively prime to n, said second function F$_2$(x,t) equals $x^t$ mod(n), and F$_2$(E(x, F$_1$(y,t)), t)=E(x, y);

inputting a message m for encryption;

selecting a random number r generating a temporary key F$_1$(e,r);

generating E(m, F$_1$(e,r));

generating F$_2$(E(m, F$_1$(e,r)), r)=E(m,e) as an encryption c of said message m with said key e; and outputting encryption c; whereby signals generated by said device which are susceptible to side-channel attack will vary with said random number r thus reducing the vulnerability of said key e to side channel analysis and F$_2$(E(m, F$_1$(e,r)), r)=($m^{e/r}$ mod(n)$^r$ mod(n), where the exponent e/r is taken to be (e)(1/r mod($\phi(n)$)), equals $m^e$ mod(n), as said encryption c of said message m; whereby a recipient of said encryption c can recover said message m as $c^d$ mod(n), where (e)(d)=1 mod($\phi(n)$).

2. A method as described in claim 1 wherein values for r and (1/r mod($\phi(n)$)) are selected from a table of predetermined values.

3. A method as described in claim 1, wherein said message m includes postal data and said encryption c is incorporated into a postal indicium.

4. A method as described in claim 1 wherein values for r are generated by a random number generator.

5. A method as described in claim 1 wherein values for r are selected from a table of predetermined values.

6. A method for operating a cryptographic device, said method comprising the steps of:

storing a key e and an encryption function $E(x,y)$, where $E(x,y)$ is an encryption of an arbitrary message x with an arbitrary key y and $E(x,Y)$ equals $x^y \mod(n)$, where n is a secret number equal to p times q, where p and q are secret prime numbers;

storing a first, resistant function $F_1(y,t)$ and providing a message recipient with a second function $F_2(x,t)$, where t is an arbitrary integer, said first function $F_1(y,t)$ equals $(y)(1/t \mod(\phi(n)))$, where $\phi(n)$ is the number of positive integers less than or equal to n that are relatively prime to n, said second function $F_2(x,t)$ equals $x^t \mod(n)$, and $F_2(E(x, F_1(y,t)), t) = E(x,y)$;

inputting a message m for encryption;

selecting a random number r generating a temporary key $F_1(e,r)$;

generating $E(m, F_1(e,r))$;

outputting $E(m, F_1(e,r))$, said message recipient being provided with said random number r; whereby said message recipient can generate $F_2(E(m, F_1(e,r)), r) = E(m,e)$ as an encryption c of said message m with said key e, and then decrypt said encryption c; and whereby signals generated by said device which are susceptible to side-channel attack will vary with said random number r thus reducing the vulnerability of said key e to side channel analysis and $F_2(E(m, F_1(e,r)), r) = (m^{e/r} \mod (n))^r \mod(n)$, where the exponent e/r is taken to be $(e)(1/r \mod(\phi(n)))$, equals $m^e \mod(n)$, as said encryption c of said message m; whereby a recipient of said encryption c can recover said message m as $c^d \mod(n)$, where $(e)(d)=1 \mod(\phi(n))$.

7. A method as described in claim 6 wherein values for r and $(1/r \mod(\phi(n)))$ are selected from a table of predetermined values.

8. A method as described in claim 6, wherein said message m includes postal data and said encryption c is incorporated into a postal indicium.

9. A method as described in claim 6 wherein values for r are generated by a random number generator.

10. A method as described in claim 6 wherein values for r are selected from a table of predetermined values.

11. A method for operating a cryptographic device, said method comprising the steps of:

storing a key d and an decryption function $D(x,y)$, where $D(x,y)$ is a decryption of an arbitrary message x with an arbitrary key y and a decryption key d;

storing a second function $F_2(x,t)$, where t is an arbitrary integer, $F_2(x,t)$ equals $x^t \mod(n)$ and $F_2(E(x, F_1(y,t)), t) = E(x,y)$, wherein $F_1(y,t)$ equals $(y)(1/t \mod(\phi(n)))$, $E(x,y)$ is an encryption function corresponding to decryption function $D(x,y)$ and said encryption function $E(x,y)$ and said decryption function $D(x,y)$ equal $x^y \mod(n)$, where n is a secret number equal to p times g, where p and a are secret prime numbers, and where $\phi(n)$ is the number of positive integers less than or equal to n that are relatively prime to n;

receiving a modified message $E(m, F_1(e,r))$, where e is an encryption key corresponding to said encryption key d, and r is a random number, and F1 is a resistant function;

obtaining r;

generating $F_2(E(m, F_1(e,r)), r) = E(m,e)$ as an encryption c of said message m with said key e; and decrypting encryption c; whereby signals generated in producing said modified message which are susceptible to side-channel attack will vary with said random number r thus reducing the vulnerability of said key e to side channel analysis and $F_2(E(m, F_1(e,r)), r) = (m^{e/r} \mod(n))^r \mod(n)$ where the exponent e/r is taken to be $(e)(1/r \mod(\phi(n)))$, equals $m^e \mod(n)$, as said encryption c of said message m; whereby a recipient of said encryption c can recover said message m as $c^d \mod(n)$, where $(e)(d)=1 \mod(\phi(n))$.

12. A method as described in claim 11, wherein said message m includes postal data and said encryption c is incorporated into a postal indicium.

13. A cryptographic device, comprising:

a data store storing a key e for an encryption function $E(x,y)$, where $E(x,y)$ is an encryption of an arbitrary message x with an arbitrary key y and said encryption function $E(x,y)$ equals $x^y \mod(n)$;

an input;

an output;

a processor controlling said cryptographic device, said processor being programmed to:

receive a message m for encryption from said input;

a select a random number r;

generate a temporary key $F_1(e,r)$, where F1 is a resistant function and $F_1(y,t)$ equals $(y)(1/t \mod(\phi(n)))$ where t is an arbitrary integer and n is a secret number equal to p times q, where p and q are secret prime numbers, and where $\phi(n)$ is the number of positive integers less than or equal to n that are relatively prime to n;

generate $E(m, F_1(e,r))$;

generate $F_2(E(m, F_1(e,r)), r)$, where $F_2(x,t)$ equals $x^t \mod(n)$ and $F_2(E(x, F_1(y,t)), n) = E(x,y)$, whereby $F_2(E(m, F_1(e,r)), r) = E(m,e)$ as an encryption c of said message m with said key c; and transmit said encryption c to said output; whereby signals generated by said device which are susceptible to side-channel attack will vary with said random number r thus reducing the vulnerability of said key e to side channel analysis and $F_2(E(m, F_1(e,r)), r) = (m^{e/r} \mod(n))^r \mod(n)$, where the exponent e/r is taken to be $(e)(1/r \mod(\phi(n)))$, equals $m^e \mod(n)$, as said encryption c of message m; whereby a recipient of said encryption c can recover said message m as $c^d \mod(n)$, where $(e)(d)=1 \mod(\phi(n))$.

14. A ceyptographic device as described in claim 13, wherein said device comprises a postage metering system and said message m includes postal data and said encryption c is incorporated into a postal indicium.

* * * * *